United States Patent
Young

[11] 3,880,139
[45] Apr. 29, 1975

[54] TRANSPORTABLE CAMPER FIREPLACE

[76] Inventor: Glenn A. Young, 417 K St., Medford, Oreg. 97501

[22] Filed: June 22, 1973

[21] Appl. No.: 372,483

[52] U.S. Cl. .................. 126/9 R; 126/25 R; 126/62; 126/126
[51] Int. Cl. ...................... F24c 1/16; F24c 15/00
[58] Field of Search ........ 126/9 R, 25 A, 25 R, 121, 126/126, 339, 62

[56] References Cited
UNITED STATES PATENTS

| | | | |
|---|---|---|---|
| 563,467 | 7/1896 | Farwell | 126/339 |
| 700,356 | 5/1902 | Mitchell | 126/9 R |
| 718,412 | 1/1903 | Bach et al. | 126/9 R |
| 1,072,231 | 9/1913 | Howell | 126/25 A |
| 1,198,693 | 9/1916 | Bond | 126/9 R |
| 1,852,404 | 4/1932 | Elbert | 126/126 |
| 2,033,859 | 3/1936 | Otte | 126/339 X |
| 2,119,798 | 6/1938 | Sivey | 126/9 R |
| 2,119,799 | 6/1938 | Sivey | 126/9 R |
| 2,207,115 | 7/1940 | Carr | 126/339 X |
| 2,512,223 | 6/1950 | Contiguglia | 126/25 A X |
| 2,747,566 | 5/1956 | Werden | 126/9 R |
| 3,220,400 | 11/1965 | Yager | 126/121 X |
| 3,809,051 | 5/1974 | Giroux | 126/126 |

*Primary Examiner*—William F. O'Dea
*Assistant Examiner*—Harold Joyce
*Attorney, Agent, or Firm*—Clarence M. Crews

[57] ABSTRACT

An erectable combined stove, fireplace and/or grill, of isosceles trapezoidal form in cross-section, and adapted to be reduced to two compact, reasonably light units for transportation is provided. The unit when in use retains all fire and sparks within an enclosure. It can be used as a fireplace or grill and food warmer with the doors open, or as a cook stove with the doors loosely closed. The isosceles trapezoidal form is particularly important for reflecting radiant heat to the space in front of the fireplace.

4 Claims, 8 Drawing Figures

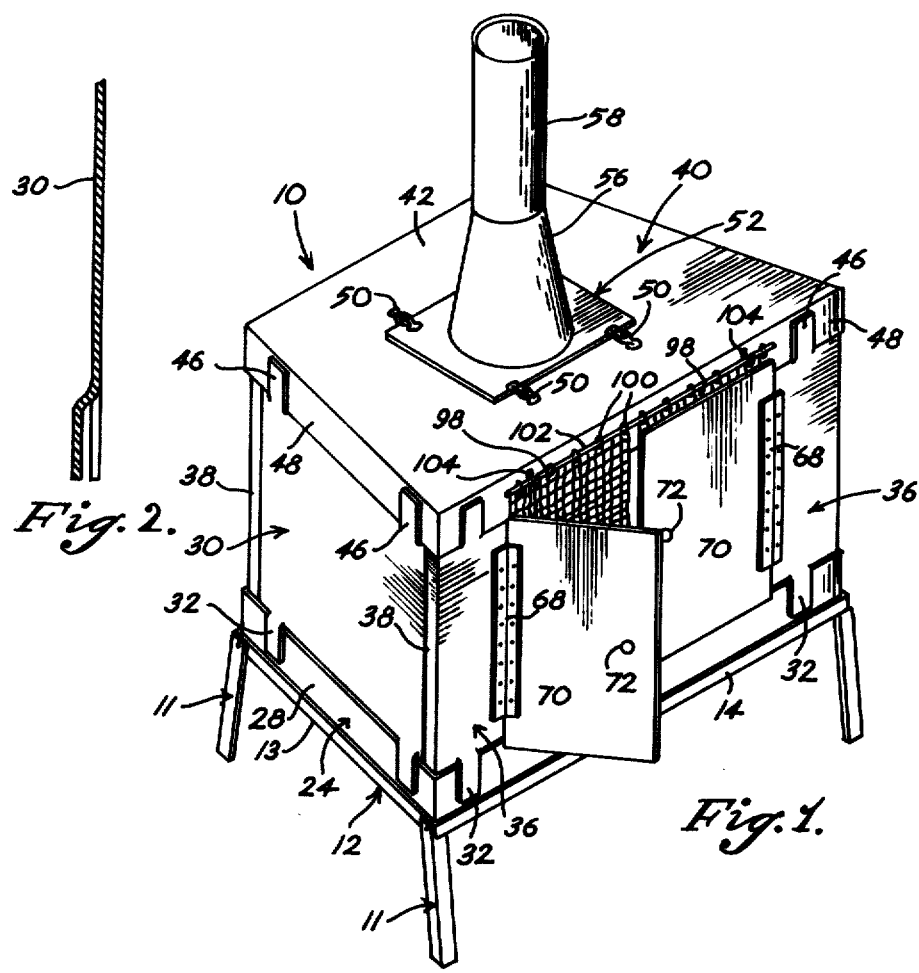
Fig. 1.
Fig. 2.
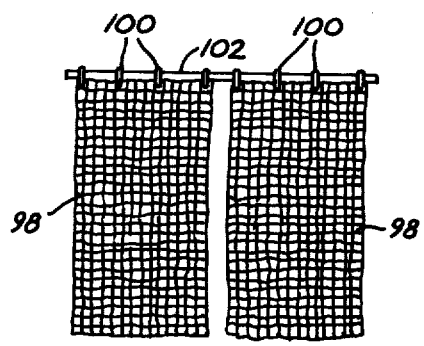
Fig. 3.
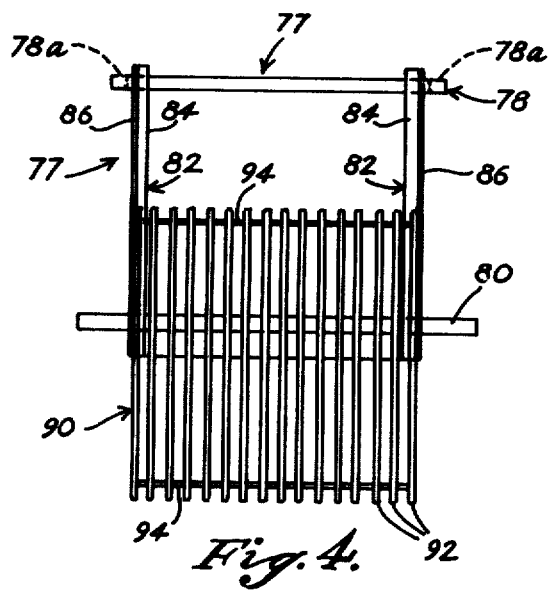
Fig. 4.

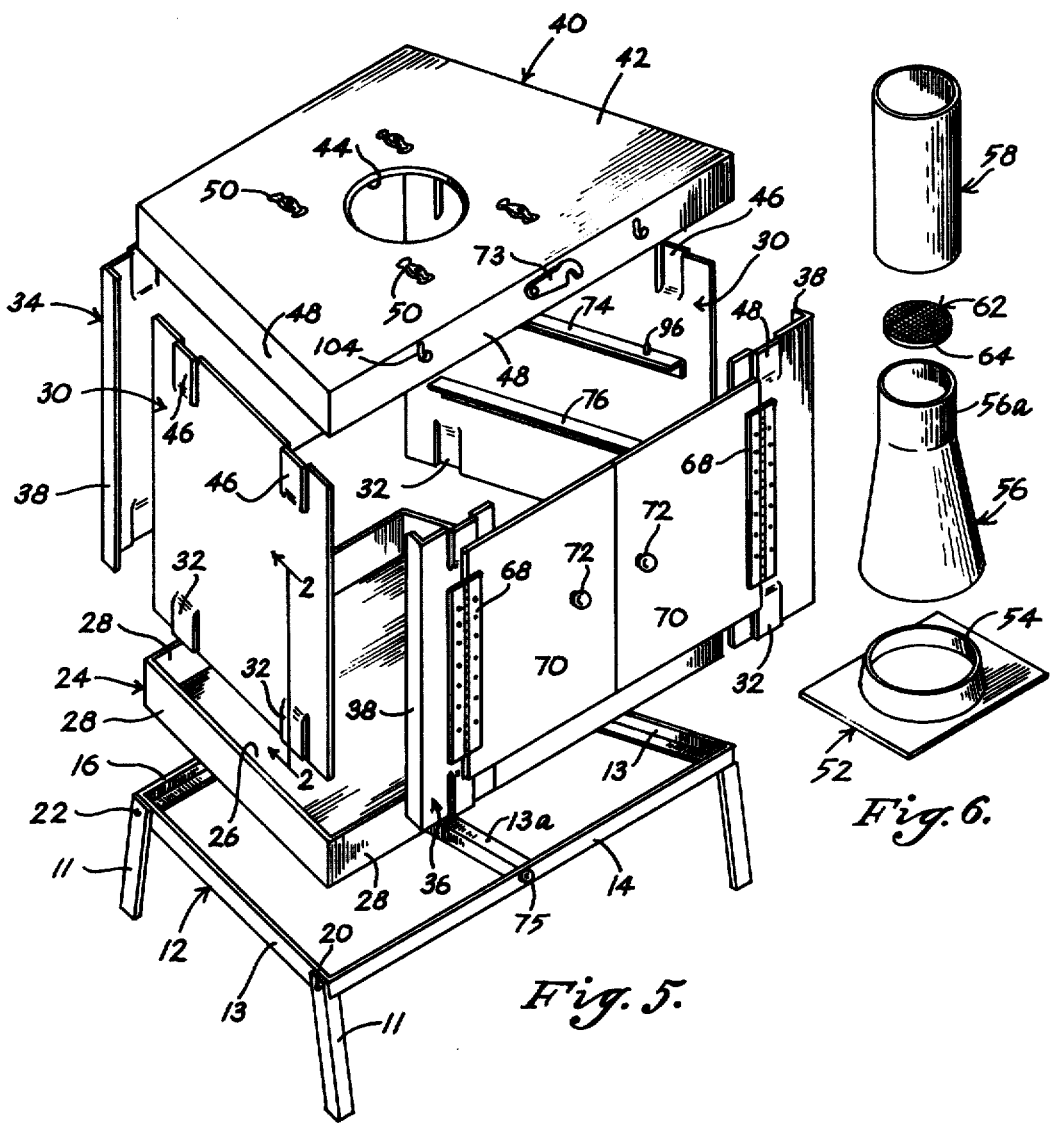
Fig. 5.
Fig. 6.
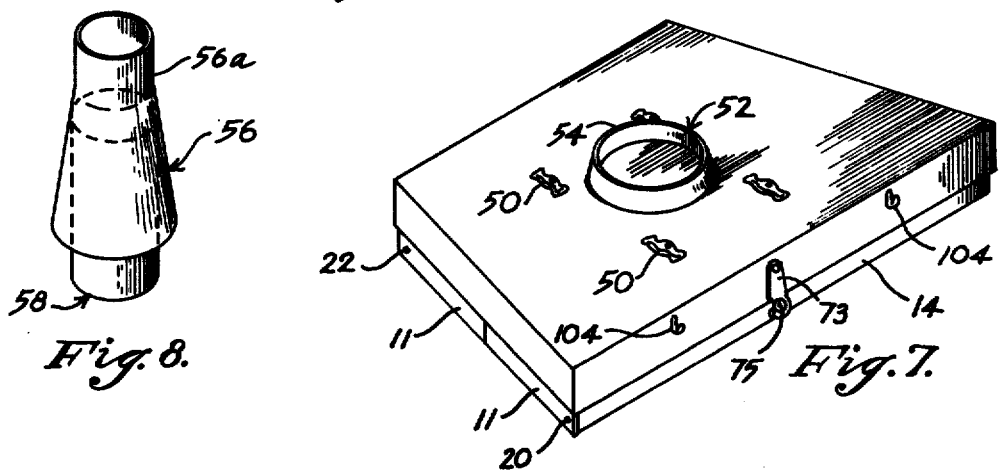
Fig. 8.
Fig. 7.

TRANSPORTABLE CAMPER FIREPLACE

This invention relates to a light, erectable, combined fireplace, grill and stove which may be taken apart and compactly packed for transportation but can be quickly and conveniently erected without resort to tools at a campsite.

It is a salient feature of the invention that the device can be used as an open fireplace in the woods without liability of spreading sparks.

It is a further feature that the fire is enclosed and supported well above the ground so that the spreading of the fire to surrounding tinder is completely guarded against.

It is a further feature that the organization includes a stand with foldable legs, a flanged tray and a flanged cover complementary to one another, and side and end vertical walls which can be packed within the tray and cover, all of said walls being formed with offset tongues along their top and bottom margins, effective when erected for embracing the flanges of the cover and tray, and one opposed pair of said vertical walls having inturned flanges along their vertical edges for wrapping around marginal portions of the other pair of vertical walls.

It is a still further feature that the device diminishes in width from front to rear. This provides for the easy acceptance of a grill support. Grill supporting rails affixed to the side walls include upstanding stops for restricting forward movement of the grill support. It further provides for effective reflection of radiant heat to the occupied space in front of the device.

It is a feature that the device is composed of interfitting parts which are few, simple, and light, but which, when interfitted, form a composite structure which is strong and firm.

Other objects and advantages will hereinafter appear.

In the drawing forming part of this specification,

FIG. 1 is a fragmentary, perspective view of the fully assembled device ready for service;

FIG. 2 is a sectional view of the lower end of a side wall, taken on the line 2—2 of FIG. 5 in the direction of the arrows;

FIG. 3 is a view in elevation of a two-section screen and a supporting rod therefor;

FIG. 4 is a plan view of a grill and a supporting frame therefor;

FIG. 5 is a perspective, exploded view showing significant details of all the parts except the chimney or flue of the device;

FIG. 6 is an exploded view showing the flue parts;

FIG. 7 shows the cover, tray and stand with the other parts, excepting the flue, housed between the cover and tray; and FIG. 8 is a perspective view showing one flue section nested within another.

The device 10 is an all-metal structure. It comprises a stand 12 which is equipped with short, pivotally supported, foldable legs 11 (compare FIGS. 1 and 5 with FIG. 7). The stand 12 is composed of angle bars which are rigidly united by welding. Each of the angle bars 13, 14 and 16 has a horizontal lower web and a vertical outer web. The front angle bar 14 is longer than the rear angle bar 16 and extends parallel to it. The side angle bars 13 are equal in length and converge from front to rear. The angle bar 13a extends at right angles to the angle bars 14 and 16.

The angle bars 13, 14 and 16 thus form a horizontal framing which has the form of an isosceles trapezoid.

The legs 11 also take the form of angle bars with one web shortened relative to the other. The shorter web of each leg provides an abutment for arresting and firmly determining a position of the leg in which it slants outward from top to bottom when the leg is swung away from the framing 13, 14, 16.

The longer web of each leg 11 includes a projecting ear 20 at its upper end through which it is pivotally connected, by means of a rivet or eyelet 22, to the vertical web of the associated angle bar 13. The arrangement is such that each leg can be folded in as shown in FIG. 7 or it can be extended as shown in FIG. 5 or FIG. 1.

A shallow metallic tray 24, adapted to rest upon the horizontal webs of the framing formed by angle bars 13, 14, 16 and to fit snugly within the vertical webs thereof, includes an imperforate bottom and continuous, upstanding side, front and rear flanges 28.

Side walls 30 are formed at their lower ends with outwardly offset tongues 32, each offset being just wide enough to accommodate the thickness of a flange 28. Back walls 34 are provided with like outwardly offset tongues 32 at their lower ends for a like purpose and the same thing is true of front wall members 36.

The back wall 34 and the front wall members 36 have substantially vertical flanges 38 at their ends which wrap around and confine marginal portions of the rigid side walls 30.

The cover 40 is generally similar to the tray 24 except that the top wall 42 has a substantial opening 44 for accommodating a flue part, to be described. The cover, however, is large enough to surround and contain the tray.

As shown, the wall members 30, 34 and 36 have outwardly offset tongues 46, like the tongues 32, for cooperating with downturned flanges 48 of the cover in the same way that the tongues 32 cooperate with the upturned flanges 28 of the tray.

The flue 58 is removably mounted on the cover 40. The cover is equipped with several rotatable hold-down latches 50. A flanged plate 52, which forms part of the flue, is placed so that its flange 54 surrounds the opening 44. The latches 50 are then turned to plate retaining positions. A frusto-conical flue section 56 having an upper cylindrical section 56a is then fitted onto the flange 54. A weld which joins the sections 56 and 56a provides an internal shoulder on which a screen 62 is set. A ring 64 which forms part of the screen rests on the shoulder. A further flue section 58, of uniform diameter throughout, is fitted into the upper end 56a of the section 56.

The front wall includes two parts 36. Each part 36 includes an end flange 38 and lower and upper offset tongues for embracing flanges 28 and 48. Each part 36 is connected through a hinge 68 to a swinging door 70. Each door has a knob 72. The doors may be opened and closed as desired. A latch 73, pivotally mounted on the front flange of the cover 40, can be swung down to overlap both doors when the doors are closed for holding them closed. The latch 73 also serves to engage a projecting button or knob 75 on the tray when the cover and tray are combined into a carrying case. The latch and knob arrangement is duplicated, but not shown, at the back of the cover and tray.

The walls 30 have affixed to their inner faces at corresponding levels, upper horizontal angle bars 74 and lower horizontal angle bars 76. These bars provide marginal support for a grill support and guide 77 which consists of a comparatively short rear cross-rod 78, a comparatively long front cross-rod 80, and parallel front to rear angle bars 82. The angle bars 82 have horizontal webs 84 which are welded on top of the rods 78 and 80 and upstanding vertical webs 86. The horizontal webs 84 serve as supports, and the vertical webs 86 serve as guides for a grill 90. The grill is composed of a substantial number of parallel longitudinal rods 92 and front and rear cross-rods 94, the rods 92 being permanently connected at their opposite ends to the cross-rods in any suitable manner, as by welding.

The grill support and guide framework 77 is put into place on the upper pair of bars 74 or the lower pair of bars 76. The short cross-rod 78 has slots 78a to receive the horizontal webs of 74 or 76. The slots 78a are indicated in dotted lines in FIG. 4. The slots are wide enough to permit some tilting of the framework 77. Each of the bars 74, 74 and 76, 76 is provided with an upstanding stop pin 96 for limiting forward sliding movement of the grill supporting framework. Thus the framework is restrained against sliding forward with the grill. The slotted arrangement prevents tilting of the framework when the grill is slid to a forward position.

Spark arresting means are provided for the door opening in the form of a pair of screens 98 which are slidingly suspended by rings 100 from a hanger rod 102. The hanger rod is laid in hooks 104 which project forward from the front flange 48 of the cover 40.

The enclosure has less height than width and less height than depth, so that the sides 30 can be readily accommodated to the tray. The back 34 can also be readily accommodated in the tray. The front, being made in two parts, can obviously be taken care of in the tray. The same thing is true of the grill support, the guide framework 77 and the grill 90.

Only the flue parts must be transported separately, and they can be compactly combined as indicated in FIG. 8.

When the fireplace has been erected, ready for use, a shallow layer of earth is desirably provided in the tray for protecting the tray against direct exposure to the fire.

I have described what I believe to be the best embodiment of my invention. What I desire to cover by letters patent, however, is set forth in the appended claims.

I claim:

1. A knockdown combined camper fireplace and stove designed to generate and efficiently to project and reflect radiant heat to the area in front of the fireplace, comprising, in combination,
   a. a supporting stand which includes a rigid frame of isosceles, trapezoidal form, composed of angle bars having inwardly extending horizontal webs and vertical upwardly extending peripheral webs, the front angle bar being parallel to, and longer than, the rear angle bar, and the side angle bars diverging significantly from rear to front, and supporting angle bar legs permanently foldably connected to the frame for adjustment between upstanding positions and positions in which they snugly fit throughout their lengths against certain of the angle bars,
   b. a body tray of isosceles trapezoidal form that fits removably into the stand frame, said tray having continuous upstanding flanges along the front, back and sides,
   c. a cover of substantially the same horizontal shape and dimensions as the body tray and having continuous downturned flanges along the front, back and sides,
   d. lateral wall members including integral sides, an integral back and a plurality of narrow front parts, each of said lateral wall members having as integral parts thereof upper and lower offset tongues cooperative with normal parts of said wall members to grip the flanges of the cover and of the body tray, respectively, in providing a stable and dependable assembly,
   e. wrap-around flanges on at least one of each pair of joint forming meeting lateral members for stabilizing said members and covering the joint,
   f. a flue,
   g. means detachably securing the flue to the cover, and
   h. cooperative latching means on the stand frame and the cover,
   the parts being so dimensioned that all of the parts except the stand and the flue can be received, in disassembled form, between the opposed, latched together, collapsed stand and the cover for transportation.

2. A knockdown, conveniently transportable camper stove and fireplace as set forth in claim 1 which further includes inwardly protruding ribs at a common level well above the body tray on the opposed divergent sides for use in the mounting of a grill, and in which the lateral members bound a chamber which is wider at the front than at the rear so that the inturned ribs diverge from rear to front, in combination with a grill support of less depth than the chamber, which support is wider at the front than at the rear, said inturned ribs being provided with upstanding stops for preventing unintended forward movement of the grill support and thereby assuring against freedom of the grill support for lateral and/or turning movement which would unavoidably be present if the grill support were free to move forward, and for also assuring that the grill support will not fall through between the diverging supporting ribs.

3. A camper stove and fireplace as set forth in claim 2 in which the grill support includes parallel supporting guides between which the grill is snugly slidable and upon which it is removably mounted, the grill, itself, being no wider than a door opening which is provided at the front of the fireplace, and being maintained in alignment with said opening by the fixity of the grill support.

4. A camper stove and fireplace as set forth in claim 1 in which complementary doors of equal widths are hingedly mounted on the respective front wall parts, the door opening being centered with respect to the front and being substantially as wide as the back wall of the trapezoidal fireplace to accommodate the passage therethrough of a grill substantially equal in width to the comparatively narrow back wall.

* * * * *